United States Patent [19]

Sanada et al.

[11] 3,925,798
[45] Dec. 9, 1975

[54] FILM-ADVANCING DEVICE FOR A CAMERA

[75] Inventors: Noriaki Sanada; Kanehiro Sorimachi, both of Yokohama, Japan

[73] Assignee: Canon Kabushiki Kaisha, Tokyo, Japan

[22] Filed: July 18, 1973

[21] Appl. No.: 380,229

[30] Foreign Application Priority Data
July 27, 1972 Japan.............................. 47-75451

[52] U.S. Cl................. 354/215; 354/212; 354/213; 354/214; 354/217; 354/218
[51] Int. Cl.²....................... G03B 1/24; B03B 1/62
[58] Field of Search....... 95/31 R, 31 CA; 242/71.6, 242/71.1; 354/212, 213, 214, 215, 216, 217, 218

[56] References Cited
UNITED STATES PATENTS

| | | | |
|---|---|---|---|
| 2,298,349 | 10/1942 | Crumrine | 95/31 R |
| 2,521,933 | 9/1950 | Mihalyi | 354/217 |
| 2,728,281 | 12/1955 | Mihalyi | 354/213 |
| 3,126,804 | 3/1964 | Wiessner et al. | 95/31 R |
| 3,465,658 | 9/1969 | MacKenberg | 354/212 |
| 3,486,431 | 12/1969 | Ettischer | 95/31 R |
| 3,581,640 | 6/1971 | Kimura | 95/31 R |
| 3,665,830 | 5/1972 | Maeda | 95/31 FL |

FOREIGN PATENTS OR APPLICATIONS

| | | | |
|---|---|---|---|
| 888,557 | 1/1962 | United Kingdom | 95/31 R |
| 946,559 | 1/1964 | United Kingdom | 95/31 R |

Primary Examiner—Joseph F. Peters, Jr.
Assistant Examiner—Russell E. Adams, Jr.
Attorney, Agent, or Firm—Flynn & Frishauf

[57] ABSTRACT

A film-transporting erroneous operation preventive device to be used for a camera of the type in which a winding shaft is disposed on the left and a magazine accommodating chamber is disposed on the right, as viewed from the back of camera, and a roll of film within the magazine is wound on the left winding shaft before photographing and film is then wound back into the right magazine while proceeding taking pictures. A stop member for locking a film-transporting mechanism in relation with a film counting mechanism is released only when film of desired length is wound on the winding shaft to initiate operation of the winding means for exposures. Release means operative in line with operation for charging film into the camera causes the stop member to place in operative condition when film is charged into the camera, while the release means causes the stop member to place in inoperative condition when film is taken out.

1 Claim, 3 Drawing Figures

3,925,798

FILM-ADVANCING DEVICE FOR A CAMERA

BACKGROUND OF THE INVENTION

1. Field of the Invention

The present invention relates to a film advance device for a camera designed for use with a film magazine, and more particularly, a camera of the type in which the film is completely wound on a temporary supply spool in the camera before photographing is begun. In such a camera the film is thereafter wound back frame by frame to the magazine as photographing proceeds.

2. Description of the Prior Art

Previously known cameras of the type just described are well known, but are subject to the disadvantage that if the first winding up step is omitted by mistake, the film end may be lost in the magazine by premature film advance operation before the user becomes aware of the error.

Cameras of the type described have an advantageously compact construction because the temporary supply spool and a lever for rotating it may be disposed at the left, in place of the usual winding back mechanism heretofore disposed at the left of camera, but the lever for the temporary supply spool may be disposed on the bottom rather than the top, so that it is possible to effectively utilize the space usually occupied by the winding back mechanism of a conventional camera. As mentioned before, however, if a film is loaded and a photographing operations attempted before performing a preliminary winding operation for winding the film on the temporary supply spool, it is quite likely that the leader portion of film will disengage from the and will become inaccessibly withdrawn into the magazine. It is extremely difficult to extricate the film leader portion once withdrawn into the magazine, except by working in a dark room.

It is the object of the invention to provide a film advance device for this type of camera with means to overcome the deficiencies noted above.

SUBJECT MATTER OF THE PRESENT INVENTION

Briefly, the film advance mechanism for winding back the film frame by frame from the temporary supply spool into the film magazine is blocked when a magazine is loaded into the camera, until the temporary supply spool has been wound to wind at least the leader portion of the film onto the temporary supply spool. This is accomplished by utilization of a film counter driven by the film as it is wound onto the temporary spool, the counter operating to release the blocking of the film advance after a predetermined length of film is wound on the temporary supply spool. An improved form of the invention provides also for release of the blocking of the film advance when no magazine is loaded in the camera, so that the camera can then have its shutter and other mechanisms tested by operation of the film advance mechanism.

The invention will now be described in detail, by way of embodiments, referring to the accompanying drawings.

DESCRIPTION OF THE PREFERRED EMBODIMENTS

Figure 1:
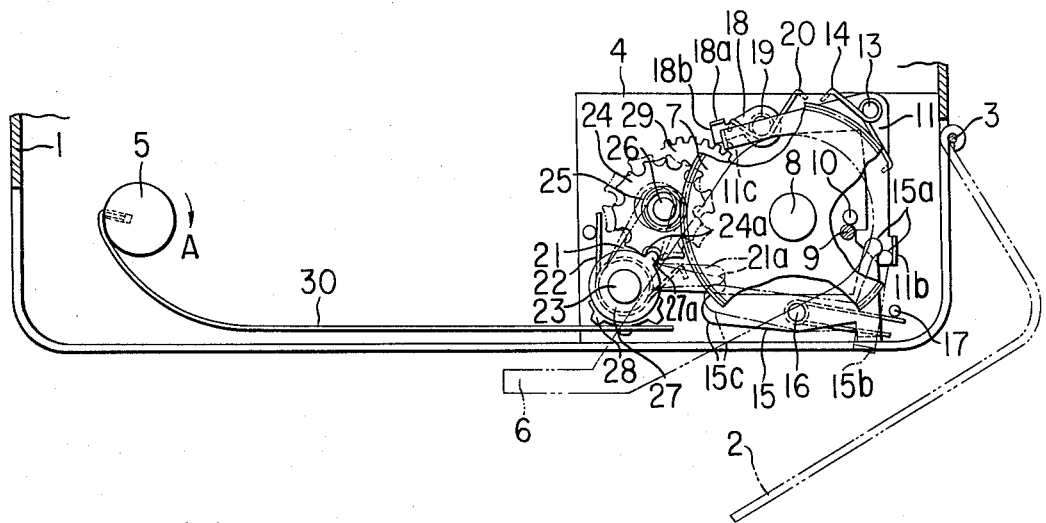
FIGS. 1 and 2 are plan views illustrating one embodiment of the the device of the invention, FIG. 1 being a view showing a film leader with its end engaged on the temporary supply spool, prior to winding, and FIG. 2 being a view showing the device after the preliminary winding has been performed.

As shown, a base plate 4 is provided on a camera body 1. A temporary supply spool shaft indicated as at 5 has the function of preliminarily winding up a film 30 in a direction as indicated by arrow A by means of a lever or other members (not shown). A winding lever 6 rotates in a counterclockwise direction on a support shaft 8 so as to wind the film back and to charge a shutter by a mechanism not shown. A film counting gear 7, which is integral with a film counting board (not shown) rotating on the support shaft 8, is provided on the base plate 4. The film counting gear 7 is always urged to be rotated in a counterclockwise direction by means of a coil spring (not shown) or the like. The gear 7 carries a pin 9 and a pin 10 affixed to acts as a stop for the pin 9 and the gear 7. Furthermore, the base plate 4 has levers 11 (safety mechanism), 15, 18 and 21 supported thereon rotatably on support shafts 13, 16, 19, and 23, respectively, and levers 11, 15, and 21 are urged to be rotated in a clockwise direction by means of springs 14, 17, and 22, respectively, while lever 18 is urged to be rotated in a counterclockwise direction by means of a spring 20.

On the other hand, at one end of the lever 21, a pinion 25 secured to a Geneva gear 24 and integrally rotated therewith is supported by a support shaft 26. The pinion 25 is normally in engagement with the film counting gear 7, but as shown in dot-dash lines in FIG. 1 and in solid lines in FIG. 3, the left end 15C of the lever 15 may bear on the end 21a of the lever 21 in a counterclockwise direction so as to impede their engagement. On the shaft 23 there is mounted a cam ring 27 provided with a cam 27a in engagement with a concave portion 24a of the Geneva gear 24, so that with operation of the film winding lever 6, a gear 29 constituting a part of transmission means (as partly shown as a gear train) rotates in a clockwise direction, and a sprocket gear 28 for transporting film rotates in a counterclockwise direction.

Operation will now be described. As shown in FIG. 1, by a chain line, back cover 2 of the camera body 1 is open with its support shaft 3 as a fulcrum. In loading film a bent portion 15b of the lever 15, disengaged from the back cover 2 because of the open position of the latter, is rotated by the force of spring 17 in a clockwise direction through a predetermined angle. The left end 15c of lever 15 therefore pushes up the projecting portion 21a of the lever 21 and causes the lever 21 to be moved in a counterclockwise direction around shaft 23 as a fulcrum to disengage the gear 25 from the film counting gear 7. The counting gear 7 is thereupon rotated in a counterclockwise direction by means of a coil spring incorporated therein (not shown) until the pin 9 affixed thereto impinges on the stop pin 10 of the base plate 4.

On the other hand, the upper end 15a of lever 15 pushes the rising portion 11b of lever 11 so as to impede engagement of the projecting portion 11a with the pin 9 and at the same time to disengage the left end 11c of lever 11 from the rising portion 18a of engaging lever 18, so that the engaging lever 18 is rotated in a counterclockwise direction by means of a spring 20, to cause the end 18b to engage with the gear 29 to impede rotation of the latter in a clockwise direction. As a result, the winding lever 16 can not be rotated in the condition shown in FIG. 1 so long as the engaging lever 18 is placed in engagement with the gear 29 to impede the rotation thereof.

FIG. 1 shows the situation, film 30 has been drawn out of its magazine (not shown) to which its other end is attached and not to be disengaged therefore even though said film is initially to be wound on the temporary supply spool shaft 5 as soon as the back cover 2 is closed. Further, it is to be understood that in winding the film 30 on the temporary supply spool shaft 5 the sprocket 28 is to be disengaged from the winding gear train by means of a clutch or in some other known manner, and is freely rotatable by movement of the film.

When the back cover 2 is closed, it pushes the bent portion 15b of lever 15, so that its left end 15c is disengaged from the projecting portion 21a of lever 21, and the lever 21 is rotated by the spring 22 in a clockwise direction until the gear 25 is engaged with the film counting gear 7. At the same time the upper end 15a of lever 15 is disengaged from the rising portion 11b of lever 11, and the lever 11 is urged by the spring 14 in a clockwise direction, but cannot rotate because its projecting portion 11a impinges on the pin 9 mounted on the film counting gear 7. Accordingly, the end 18b of engaging lever 18 remains engaged with the gear 29 to impede its rotation in a clockwise direction, as shown in FIG. 1, so that operation of the winding lever 6 is still blocked as previously described.

This blocking of the winding lever 6 indicates that the preliminary winding of film has not been performed, thus preventing trouble from premature operation of the winding lever such as disengagement of the film and from the shaft 5, or even less of accessibility of the film leader portion by its withdrawal into the magazine.

Figure 2:
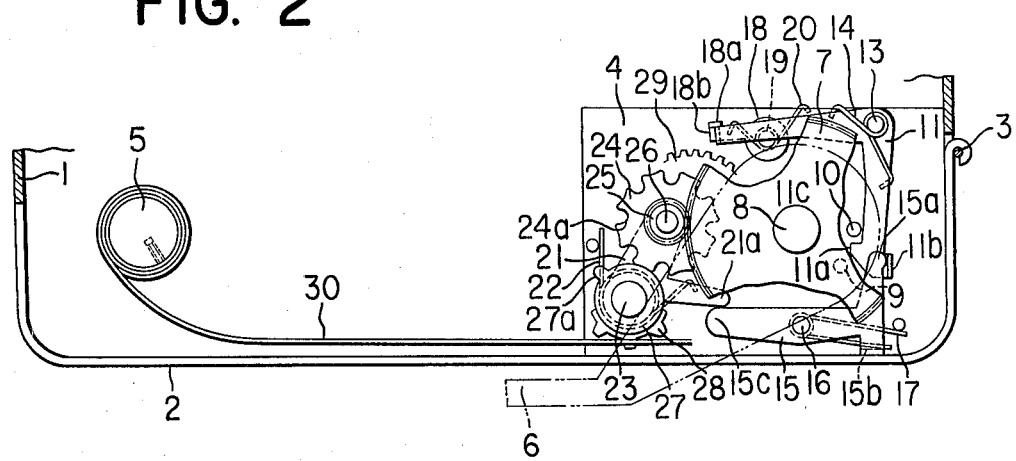

FIG. 2 shows the situation after the preliminary winding has been performed. The shaft 5 has been rotated in a clockwise direction by the preliminary winding operation to wind the film 30. Rotation of the sprocket 28 by the travel of the film has rotated the cam wheel 27 in the same direction, placing the cam 27a of cam wheel 27 in engagement once in each rotation thereof with the concave portion 24a of Geneva gear 24, causing the Geneva gear 24 to rotate intermittently in a counterclockwise direction. The gear 25 integrally coupled with said Geneva gear 24 is similarly rotated by the preliminary winding causing the film counting gear 7 engaged therewith to indicate the number of frames of film available.

At the same time, the pin 9 planted on the counting gear 7 has been moved from its position against the stop pin 10. When the film has been preliminarily wound by a predetermined minimum amount determined by the shape of the lever 11 with reference to the movement of the pin 9, e.g. winding of three frames, the lever 11 is freed to rotate in a clockwise direction till it impinges on the fixed pin 10, so that the left end 11c of lever 11 pushes up the rising portion 18a of engaging lever 18 in a clockwise direction. Thereupon the end 18b of engaging lever 18 is disengaged from the gear 29 to place the gear 29 in a rotatable condition, allowing operation the winding lever 6. The film advance mechanism is now ready for making exposures.

The film leader portion pulled out from the magazine for loading is usually exposed to the outside light unless it is loaded into the camera in a dark room or the like. It is therefore to be understood that in a camera embodying the device of this invention, transmission mechanisms (such as speed ratio, rotation of lever, etc.) are so arranged that when the preliminary winding is performed, the above-mentioned operation of the film advance mechanism to make exposures can be performed as soon as the film leader portion has been wound on the preliminary winding shaft, that is, from when a first unexposed film is positioned in an image frame. It is up to the user to wind the film all the way or, for some reason of his own, only part way in the preliminary operation.

From a viewpoint of the prevention of erroneous operations, the device according to the invention has great advantages as described above, because the film advance operation for exposures is impossible unless the preliminary winding has been performed with a film properly loaded. The film winding operation described should be performed whenever it is desired to check the condition of various mechanisms, as for a test operation of the shutter, or of movement of a gear train, or the like.

Figure 3:
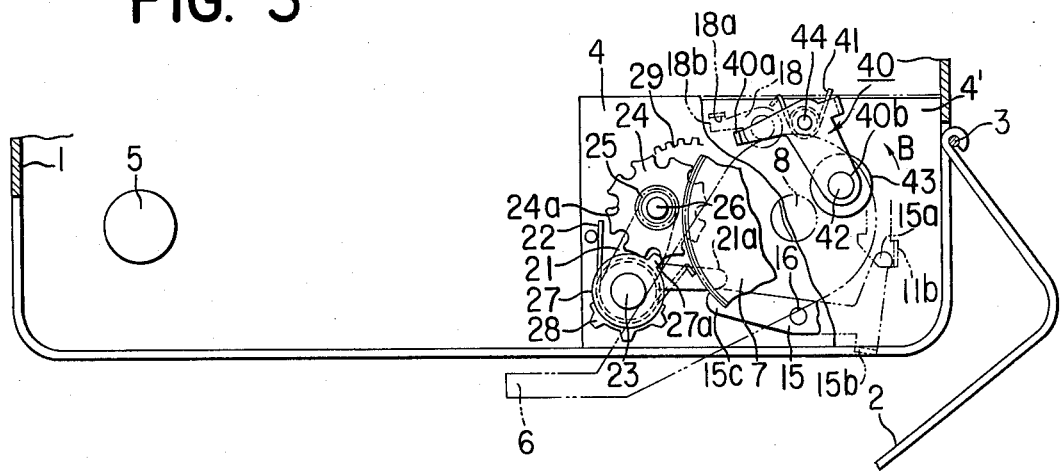
FIG. 3 is a plan view showing a modified embodiment of the invention.

In another embodiment of the invention, accordingly, another base plate 4' is provided beneath the base plate 4, as shown in FIG. 3, and a lever 40 (release mechanism) which is urged to be rotated in a clockwise direction by a spring 41 around a shaft 44 fixed on the second base plate 4' as a fulcrum.

This lever 40 has nothing to do with the lever 11, 15, and 21, but is related only to the stop lever 18 of the gear 29. At its end 40b the lever 40 has a roller 43 rotatably mounted on a support shaft 42. In the embodiment shown, the other end 40a of the lever 40 pushes up the engaging lever 18 passing through the base plate 4 in a clockwise direction to disengage said one end 18b from the gear 29. Therefore, the gear 29 may be rotated because it is not impeded even if the winding lever 6 is operated. Thus, the winding back operation may be performed when no film is loaded. Further, since the lever 40 is held in the position shown even when the back cover 2 is closed, unless a film is loaded, the winding back operation may be performed repeatedly. When a magazine (not shown) is put into the camera for loading film, however, an outer peripheral portion of the magazine pushes the roller 43 in the direction indicated by the arrow in FIG. 3, so that the lever 40 rotates in a counterclockwise direction on the support shaft 44 to disengage one end 40a of lever 40 from the stop lever 18. As a result, the stop lever 18 is rotated in a counterclockwise direction by means of the spring 20 and the end 18b is engaged with the gear 29 and placed in the condition shown in FIG. 1, so that the gear 29 can not be rotated, and the winding back operation can not be performed unless the preliminary winding as described above is first performed.

As above described, the device of the invention is provided with a safety mechanism which allows no winding for photographing purpose in case the film is not preliminarily wound, whereby such troubles as the disengagement of the film leader portion from the preliminary winding shaft, or the disappearance of the film leader portion into the magazine, may be prevented. There is further provided a stop-release mechanism actuated by loading a film magazine to allow the winding back operation to be performed as in photographing when no film is loaded in the camera, so that tests such as of shutter operation, movement of a gear train and the like may be carried out.

We claim:

1. A film advancing device for a camera using a magazine to accomodate a roll film therein, which comprises in combination:

supply spool means for winding the film out of the magazine and onto a supply spool of said means prior to phototaking;

means for taking up the film wound on said supply spool back into the magazine, said take-up means having a film take up lever, said take up lever being so arranged as to be able to control frame-by-frame movement of the film;

film counter means movably operative in correspondence to the film winding operation of said supply spool and to the frame-by-frame movement of the film by said film take-up means;

means for locking said take-up means, said locking means being associated with and responsive to said film counter means to lock said take-up means against movement in the take-up direction prior to completion of an initial portion of said film winding operation and to release said take-up means after a predetermined length of the film is wound up on said supply spool; and means for driving said film counter means in accordance with movement of said film, said driving means being so interlocked with the back cover of the camera as to be engaged and disengaged with said film counter means and to cause said film counter means to displace to a position where said driving means cannot drive the counter when said camera back cover is open.

* * * * *